United States Patent
Murase et al.

(10) Patent No.: US 9,634,366 B2
(45) Date of Patent: Apr. 25, 2017

(54) HIGH-FREQUENCY MODULE

(71) Applicant: Murata Manufacturing Co., Ltd., Nagaokakyo-shi, Kyoto-fu (JP)

(72) Inventors: Hisanori Murase, Nagaokakyo (JP); Muneyoshi Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 517 days.

(21) Appl. No.: 14/102,626

(22) Filed: Dec. 11, 2013

(65) Prior Publication Data
US 2014/0097999 A1    Apr. 10, 2014

Related U.S. Application Data

(63) Continuation of application No. PCT/JP2012/065720, filed on Jun. 20, 2012.

(30) Foreign Application Priority Data

Jun. 27, 2011   (JP) .................................. 2011-141299

(51) Int. Cl.
*H04B 1/38* (2015.01)
*H04L 5/16* (2006.01)
(Continued)

(52) U.S. Cl.
CPC .................. *H01P 1/10* (2013.01); *H01P 1/15* (2013.01); *H01Q 1/50* (2013.01); *H01Q 21/0006* (2013.01); *H04B 1/0057* (2013.01)

(58) Field of Classification Search
CPC  H01P 1/10; H01P 1/15; H04B 1/0057; H01Q 1/50; H01Q 21/0006; H01H 1/0036; H04H 40/90
(Continued)

(56) References Cited

U.S. PATENT DOCUMENTS 8,009,725 B2 *   8/2011   Petrovic ................. H04H 40/90
                                                             375/220
2004/0113713 A1*  6/2004   Zipper ................. H01H 1/0036
                                                             333/103
(Continued)

FOREIGN PATENT DOCUMENTS

JP    2000-357917 A   12/2000
JP    2004-297455 A   10/2004
(Continued)

OTHER PUBLICATIONS

Official Communication issued in International Patent Application No. PCT/JP2012/065720, mailed on Aug. 7, 2012.
(Continued)

*Primary Examiner* — Phuong Phu
(74) *Attorney, Agent, or Firm* — Keating & Bennett, LLP (57) ABSTRACT

A high-frequency module includes port electrodes defining external connection terminals provided on a multilayer body including dielectric layers. A first port electrode is connected to an antenna. A plurality of port electrodes other than the first port electrode are respectively connected to communication systems supporting respective frequency bands. The first port electrode is connected to the plurality of other port electrodes through a plurality of switch elements. A first group of the plurality of switch elements and a second group of the plurality of switch elements are not connected to each other within a switch circuit and are connectable to each other through a common terminal outside of the switch circuit. As a result, a high-frequency module that allows a design change to be made using the same switch circuit without changing the switch circuit is provided.

13 Claims, 8 Drawing Sheets

(51) Int. Cl.
  *H01P 1/10*       (2006.01)
  *H04B 1/00*       (2006.01)
  *H01P 1/15*       (2006.01)
  *H01Q 1/50*       (2006.01)
  *H01Q 21/00*      (2006.01)

(58) Field of Classification Search
  USPC ............. 375/260, 219, 220, 222; 333/103
  See application file for complete search history.

(56) References Cited

U.S. PATENT DOCUMENTS

| | | |
|---|---|---|
| 2004/0203552 A1 | 10/2004 | Horiuchi et al. |
| 2007/0075803 A1 | 4/2007 | Kemmochi et al. |
| 2008/0030255 A1 | 2/2008 | Okashita |
| 2009/0201209 A1 | 8/2009 | Boyle |
| 2011/0110452 A1 | 5/2011 | Fukamachi et al. |

FOREIGN PATENT DOCUMENTS

| | | |
|---|---|---|
| JP | 2005-020140 A | 1/2005 |
| JP | 2007-97066 A | 4/2007 |
| JP | 2008-042343 A | 2/2008 |
| JP | 2008-271420 A | 11/2008 |
| JP | 2008-539642 A | 11/2008 |
| JP | 2010-252346 A | 11/2010 |
| WO | 2009/157357 A1 | 12/2009 |

OTHER PUBLICATIONS

Official Communication issued in corresponding Japanese Patent Application No. 2013-522788, mailed on Jul. 1, 2014.

\* cited by examiner

HIGH-FREQUENCY MODULE

BACKGROUND OF THE INVENTION

1. Field of the Invention

The present invention relates to high-frequency modules that enable communication in a plurality of frequency bands using a common antenna, for example, in multi-band communication.

2. Description of the Related Art

Many recent information communication apparatuses and the like, such as cellular phones, have a function that allows a single apparatus to utilize a plurality of frequency bands (multiple bands). In a communication apparatus having such a function, for example, a plurality of circuit devices such as demultiplexers are mounted on a single high-frequency-circuit multilayer substrate to support a plurality of frequency bands. In this case, when a plurality of circuit devices are mounted on a multilayer substrate, the size of the multilayer substrate is increased. Hence, for example, a module has been proposed in which a common antenna is used for a plurality of frequency bands instead of using a plurality of antennas for respective frequency bands, thereby decreasing the number of circuit devices mounted on a multilayer substrate and suppressing an increase in size (refer to, for example, Japanese Unexamined Patent Application Publication No. 2008-271420).

Figure 1:
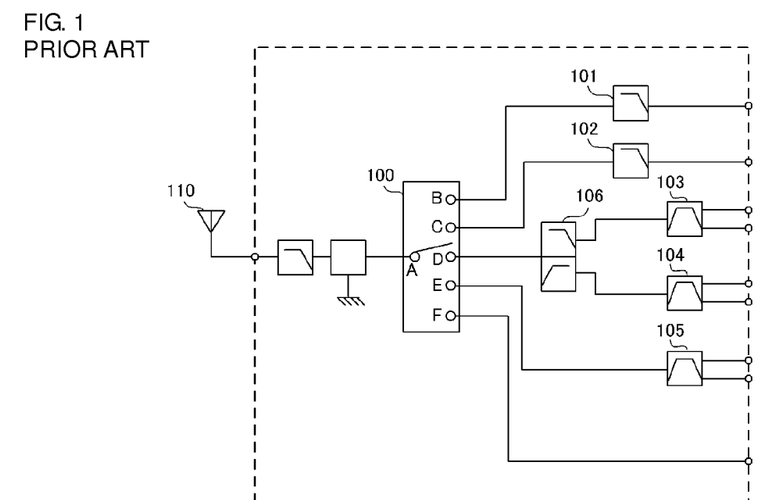
FIG. 1 is a schematic diagram illustrating a switch module disclosed in Japanese Unexamined Patent Application Publication No. 2008-271420.

FIG. 1 is a schematic diagram illustrating a switch module disclosed in Japanese Unexamined Patent Application Publication No. 2008-271420. The switch module disclosed in Japanese Unexamined Patent Application Publication No. 2008-271420 includes an FET switch circuit 100 functioning as a multi-port device (SPnT (single-input multiple-outputs)) switch. The FET switch circuit 100 is a switch for switching a transmission path through which a transmission/reception signal of a communication system passes, and connects a terminal A connected to a common antenna 110 to one of terminals B to F which are connected to filter circuits 101 to 105 corresponding to respective frequency bands or a demultiplexer 106. As a result, communication in a plurality of frequency bands can be realized using a common antenna, in Japanese Unexamined Patent Application Publication No. 2008-271420.

However, there is a problem in that, in Japanese Unexamined Patent Application Publication No. 2008-271420, when a design change is made in such a manner that the number of terminals connected to the outside is changed, the FET switch circuit needs to be changed or provided in a corresponding greater number, thereby making it difficult to make a design change in Japanese Unexamined Patent Application Publication No. 2008-271420.

SUMMARY OF THE INVENTION

Hence, preferred embodiments of the present invention provide a high-frequency module that allows a design change to be made using the same switch circuit without changing the switch circuit.

A high-frequency module according to a preferred embodiment of the present invention includes a multilayer body including dielectric layers stacked on each other; an external input/output terminal that is provided on the multilayer body and that receives and outputs a signal; at least two external connection terminals that are provided on the multilayer body and that output a signal received at the external input/output terminal or receive a signal to be output from the external input/output terminal; and a switch circuit that is mounted on a surface of the multilayer body and that includes a first switch element connected to the external input/output terminal and to one of the external connection terminals; and a second switch element connected to the first switch element on the external input/output terminal side and to the other of the external connection terminals. The switch circuit further includes at least one third switch element that is not connected to the first switch element and the second switch element within the switch circuit and that is arranged to be electrically connected to the first switch element and the second switch element outside the switch circuit.

With this configuration, the switch circuit includes a third switch element that is not connected to the first switch element and the second switch element within the switch circuit and that is arranged to be electrically connected to the first switch element and the second switch element outside the switch circuit. Hence, even when the high-frequency module includes another external terminal other than the external input/output terminal and the external connection terminals, the same switch circuit can be used. For example, when the high-frequency module includes an external output terminal that outputs a signal received at the external input/output terminal, by connecting the third switch element to the external input/output terminal and the external output terminal, the destination to which the external input/output terminal is connected is capable of being switched to either the external connection terminal or the external output terminal.

In this manner, independent of the number of terminals of the high-frequency module, the design of the high-frequency module can be easily changed, under the constraints of the number of existing third switch elements, without causing a problem of an increase in cost due to a change in the type of switch circuit or an increase in the number of mounted switch circuits.

A high-frequency switch module according to a preferred embodiment of the present invention may have a configuration in which the external input/output terminal is an antenna terminal connected to an antenna, and the external connection terminals are terminals connected to a communication system that performs communication through the antenna.

With this configuration, the high-frequency module can be used as a switch module that connects the antenna to or disconnects the antenna from the communication system.

A high-frequency switch module according to a preferred embodiment of the present invention, preferably, has a configuration in which as the external input/output terminal, a first antenna terminal connected to an antenna supporting a first frequency band and a second antenna terminal connected to an antenna supporting a second frequency band are provided, the external connection terminals include a first output terminal that outputs a signal to a communication system supporting the first frequency band, a first input terminal arranged to receive a signal from the communication system supporting the first frequency band, a second output terminal that outputs a signal to a communication system supporting the second frequency band, and a second input terminal that receives a signal from the communication system supporting the second frequency band, the first switch element is one of two first switch elements included in the switch circuit and the second switch element is one of two second switch elements included in the switch circuit, one of the first switch elements is connected to the first antenna terminal and the first output terminal, the other of the first switch elements is connected to the second antenna terminal and the second output terminal, one of the second switch elements is connected to one of the first switch elements on the first antenna terminal side and is connected to the first input terminal, and the other of the second switch elements is connected to the other of the first switch elements on the second antenna terminal side and is connected to the second input terminal.

With this configuration, the high-frequency module can be a high-frequency switch module for multi-band communication. Since the third switch element can also be used for either of the first frequency band and the second frequency band, design changes can be easily made.

A high-frequency switch module according to a preferred embodiment of the present invention may have a configuration in which a ground conductor is provided in the multilayer body and the third switch element is connected to the ground electrode.

With this configuration, since the terminals of the third switch elements are grounded, an influence from undesired reflection or the like is prevented.

A high-frequency switch module according to a preferred embodiment of the present invention may have a configuration in which the third switch element is connected to the first switch element and the second switch element through a wiring electrode located on a surface of and/or within the multilayer body.

With this configuration, a signal path can be changed as a result of the third switch element being connected to the first switch element and the second switch element.

According to various preferred embodiments of the present invention, independent of the number of terminals of the high-frequency module, the design of the high-frequency module can be easily changed, under the constraints of the number of existing third switch elements, without causing a problem of an increase in cost due to a change in the type of switch circuit or an increase in the number of mounted switch circuits.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a high-frequency module according to the present invention will be described with reference to the drawings. In the preferred embodiments described below, descriptions are made on a high-frequency modules that preferably perform transmission/reception of a communication signal of Global System for Mobile Communications (GSM) (registered trademark) 850, a communication signal of GSM 900, a communication signal of GSM 1800, a communication signal of GSM 1900, and communication signals of band classes Band 1 (2 GHz frequency band), Band 2 (1 GHz frequency band), Band 5 (800 MHz frequency band), and Band 8 (900 MHz frequency band) of Wideband Code-Division Multiple Access (W-CDMA) communication system.

Figure 2:
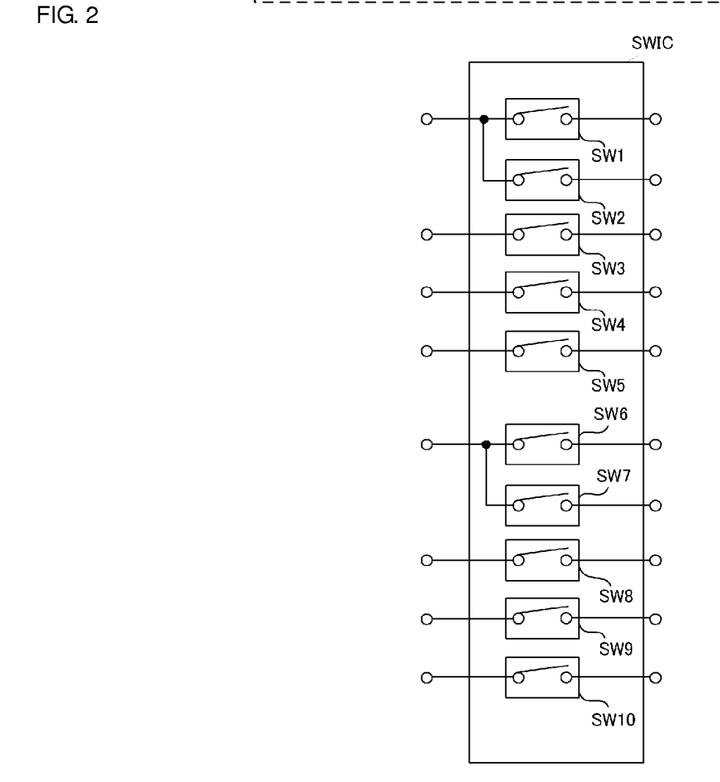
FIG. 2 is a schematic diagram illustrating a configuration of a switch circuit used in a high-frequency module according to a preferred embodiment of the present invention.
Figure 3:
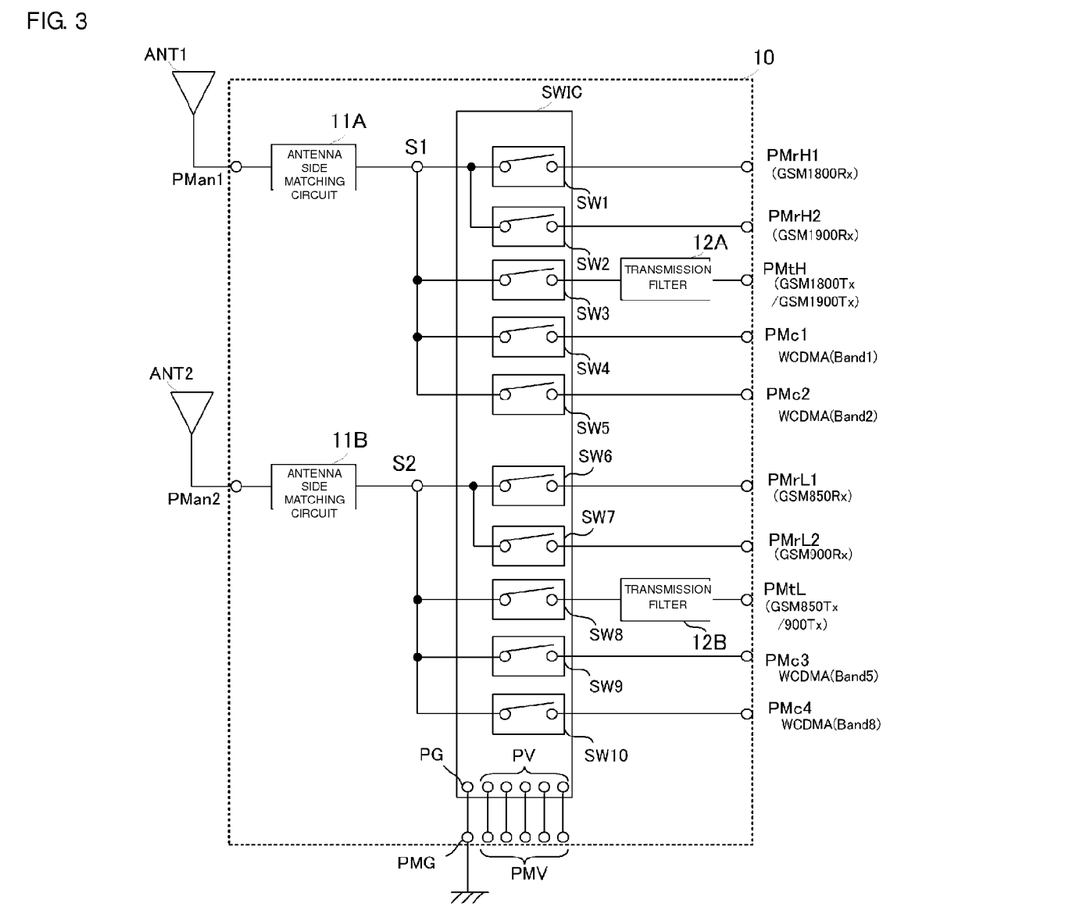
FIG. 3 is a schematic diagram illustrating a configuration of the high-frequency module according to a preferred embodiment of the present invention.

FIG. 2 is a schematic diagram illustrating the configuration of a switch circuit used in a high-frequency module according to a preferred embodiment of the present invention. FIG. 3 is a schematic diagram illustrating the configuration of the high-frequency module according to the preferred embodiment.

A high-frequency module 10 is a high-frequency switch module that enables multi-band communication in a high band (first frequency band) and a low band (second frequency band). In the present preferred embodiment, the high band refers to GSM 1800, GSM 1900, W-CDMA (Band 1), and W-CDMA (Band 2), and the low band refers to GSM 850, GSM 900, W-CDMA (Band 5), and W-CDMA (Band 8).

The high-frequency module 10 includes a switch circuit SWIC. The high-frequency module 10 includes a multilayer body (not illustrated) in which dielectric layers are stacked on top of one another, and the switch circuit SWIC is mounted on the surface of the multilayer body. The switch circuit SWIC includes switch elements SW1 to SW10, as illustrated in FIG. 2.

The switch elements SW1 to SW10 are, for example, field effect transistor (FET) switches. The switch elements SW1 to SW5 are switches for the low band and the switch elements SW6 to SW10 are switches for the high band. The switch elements SW1 to SW10 are connected to external connection terminals and control connection and disconnection among the terminals.

Note that the switch elements SW1 to SW10 are not limited to FET switches and may be changed to switches of any type that can be used as high-frequency switches, such as micro electro mechanical systems (MEMS) switches and diode switches, for example.

Regarding the switch element (first switch element) SW1 for the high band, one terminal is connected to a common terminal S1 outside of the switch circuit SWIC and the other terminal is connected to a port electrode PMrH1. The common terminal S1 is connected to a port electrode (first antenna terminal) PMan1 through an antenna side matching circuit 11A that also functions as an electro static discharge (ESD) circuit. The port electrode (first antenna terminal)

PMan1 is connected to an external antenna ANT1 for the high band. The port electrode PMrH1 is a port that outputs a GSM 1800 reception signal to the outside (communication system).

Regarding the switch element (second switch element) SW2 for the high band, one terminal is connected within the switch circuit SWIC to the one terminal of the switch element SW1 connected to the common terminal S1, and the other terminal is connected to a port electrode (first output terminal) PMrH2. In other words, similarly to the switch element SW1, the one terminal of the switch element SW2 is connected to the port electrode PMan1 through the common terminal S1 and the antenna side matching circuit 11A. The port electrode PMrH2 is a port that outputs a GSM 1900 reception signal to the outside (communication system).

Regarding the switch element (third switch element) SW3 for the high band, one terminal is connected to the common terminal S1, and the other terminal is connected to a port electrode (first input terminal) PMtH through a transmission filter 12A. The port electrode PMtH is a port to which a GSM 1800 or GSM 1900 transmission signal is input from the outside (communication system). The transmission filter 12A is a filter that attenuates the second harmonic and third harmonic of a GSM 1800 or GSM 1900 transmission signal and has a pass band which is the frequency band of a GSM 1800 or GSM 1900 transmission signal.

Regarding the switch element (third switch element) SW4 for the high band, one terminal is connected to the common terminal S1 and the other terminal is connected to a port electrode PMc1. The port electrode PMc1 is a port that outputs a W-CDMA (Band 1) transmission signal to the outside and receives a W-CDMA (Band 1) reception signal from the outside.

Regarding the switch element (third switch element) SW5 for the high band, one terminal is connected to the common terminal S1 and the other terminal is connected to a port electrode PMc2. The port electrode PMc2 is a port that outputs a W-CDMA (Band 2) transmission signal to the outside and receives a W-CDMA (Band 2) reception signal from the outside.

Regarding the switch element (first switch element) SW6 for the low band, one terminal is connected to a common terminal S2 outside of the switch circuit SWIC and the other terminal is connected to a port electrode (second output terminal) PMrL1. The common terminal S2 is connected to a port electrode (second antenna terminal) PMan2 through an antenna side matching circuit 11B that also functions as an ESD circuit. The port electrode PMan2 is connected to an external antenna ANT2 for the low band. The port electrode PMrL1 is a port that outputs a GSM 850 reception signal to the outside.

Regarding the switch element (second switch element) SW7 for the low band, one terminal is connected to the common terminal S2 and the other terminal is connected to a port electrode (second output terminal) PMrL2. In other words, the one terminal of the switch element SW7, similarly to the switch element SW6, is connected to the port electrode PMan2 through the common terminal S2 and the antenna side matching circuit 11B. The port electrode PMrL2 is a port that outputs a GSM 900 reception signal to the outside.

Regarding the switch element (third switch element) SW8 for the low band, one terminal is connected to the common terminal S2 and the other terminal is connected to a port electrode (second output terminal) PMtL through a transmission filter 12B. The port electrode PMtL is a port to which a GSM 850 or GSM 900 transmission signal is input from the outside. The transmission filter 12B is a filter that attenuates the second harmonic and third harmonic of a GSM 850 or GSM 900 transmission signal and has a pass band which is the frequency band of a GSM 850 or GSM 900 transmission signal.

Regarding the switch element SW9 for the low band, one terminal is connected to the common terminal S2 and the other terminal is connected to a port electrode PMc3. The port electrode PMc3 is a port for outputting a W-CDMA (Band 5) transmission signal to the outside and receiving a W-CDMA (Band 5) reception signal from the outside.

Regarding the switch element SW10 for the low band, one terminal is connected to the common terminal S2 and the other terminal is connected to a port electrode PMc4. The port electrode PMc4 is a port that outputs a W-CDMA (Band 8) transmission signal to the outside and receives a W-CDMA (Band 8) reception signal from the outside.

As described above, within the switch circuit SWIC, the switch elements SW3 to SW5 and the switch elements SW8 to SW10 of the switch circuit SWIC preferably are arranged independent of one another in a non-connected state and connectable to one another outside the switch circuit SWIC, and are connected to one another through the common terminal S1 or S2. In other words, in the case where the switch circuit SWIC is used when the high-frequency module 10 is formed, signal paths (pattern electrodes described later) to be connected to the switch elements SW3 to SW5 and the switch elements SW8 to SW10 can be appropriately changed.

For example, in FIG. 3, the switch elements SW3 to SW5 are made to be the switches for the high band and are connected to the common terminal S1. However, when the switch elements SW3 to SW5 are to be used as the switches for the low band, the switch elements SW3 to SW5 can be connected to the common terminal S2. Further, when an antenna for another frequency band and port electrodes connected to a communication system for that frequency band are provided, the switch elements SW3 to SW5 can be connected to that antenna and the corresponding electrodes. In this manner, even when the design of the high-frequency module 10 is changed, only signal paths in a multilayer body need to be changed, whereby the switch circuit SWIC need not be changed to another switch circuit.

Note that the switch circuit SWIC includes a ground terminal PG to be connected to the ground GND. The ground terminal PG is connected to a ground port electrode PMG of the high-frequency module 10 for external connection. The switch circuit SWIC includes voltage application terminals PV that apply driving voltages and control voltages. The voltage application terminals PV are connected to power supply and control port electrodes PMV of the high-frequency module 10 for external connection. The switch circuit SWIC performs on/off control of the switch elements SW1 to SW10 in accordance with the combination of control voltages applied to the voltage application terminals PV that apply control voltages.

Figure 4:
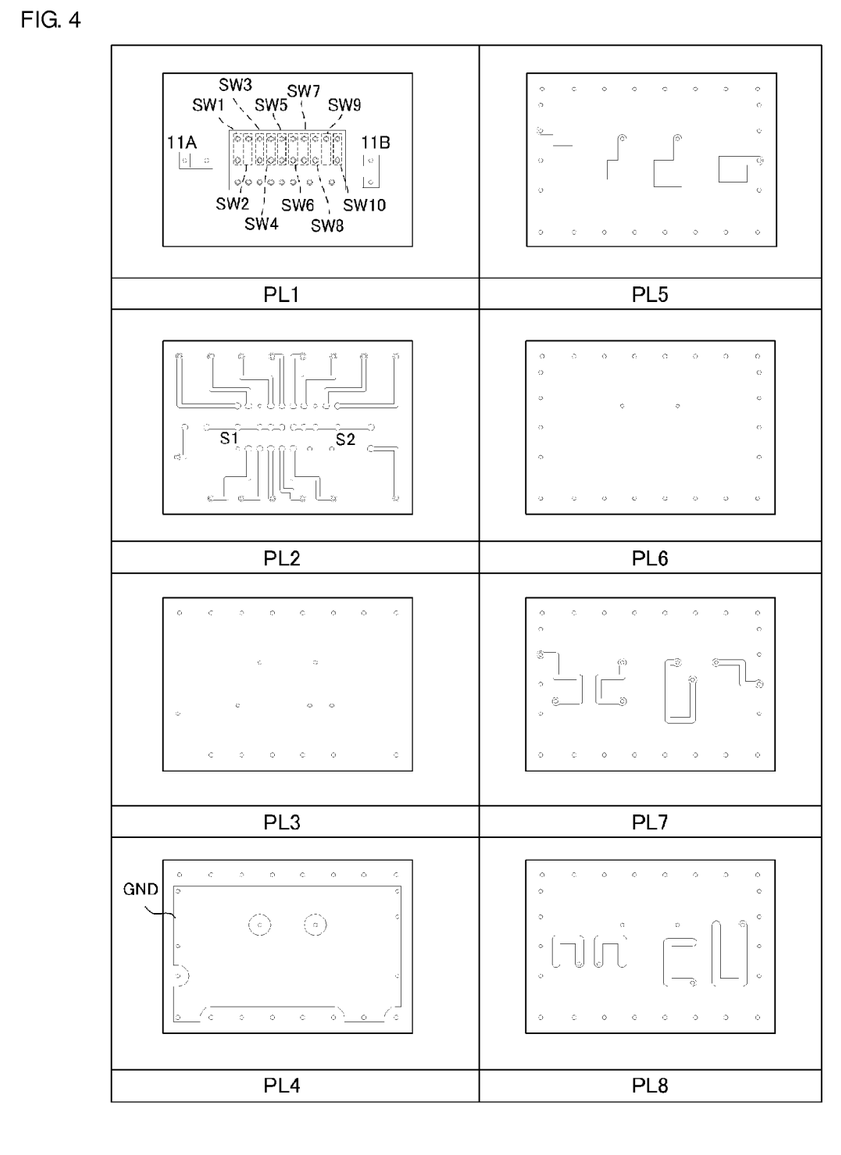
FIG. 4 is a stacking diagram of the high-frequency module of a preferred embodiment of the present invention.
Figure 5:
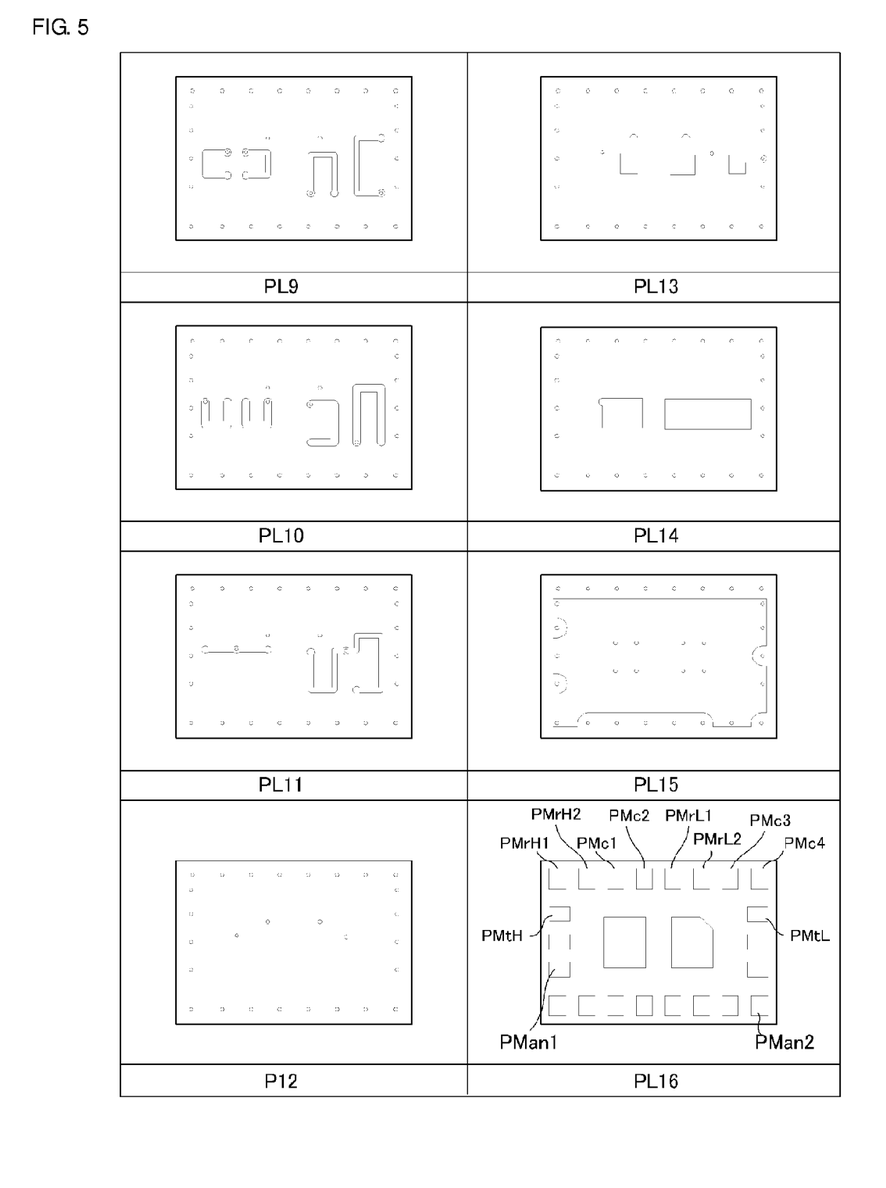
FIG. 5 is a stacking diagram of the high-frequency module of a preferred embodiment of the present invention.

FIG. 4 and FIG. 5 are stacking diagrams of the high-frequency module 10 of the present preferred embodiment. Note that FIG. 4 and FIG. 5 illustrate electrode patterns of the dielectric layers of the multilayer body, seen from below.

The multilayer body preferably is formed by stacking 16 layers, and predetermined electrode patterns for forming the high-frequency module 10 as well as via electrodes for interlayer connection are formed on or in the dielectric layers, for example. Note that the via electrodes are illustrated using circles on the layers in FIG. 4 and FIG. 5. In the description below, it is assumed that the uppermost layer is a first layer PL1 and the lowermost layer is a 16th layer PL16, where increasingly lower layers are denoted by increasingly larger numbers.

On the top surface of the first layer PL1, which is the uppermost layer, element mounting electrodes that mount circuit elements are provided as described above. Note that the switch circuit SWIC and the antenna side matching circuits 11A and 11B are illustrated in FIG. 4.

A second layer PL2 includes wiring pattern electrodes provided thereon. On the second layer PL2, first terminals of the switch elements SW1 to SW5 are connected to the common terminal S1 using the same electrode pattern. Note that this electrode pattern is connected to one terminal of the antenna side matching circuit 11A. The other terminal of the antenna side matching circuit 11A is connected to the port electrode PMan1 which is one of the port electrodes arranged in an array on the 16th layer PL16 described later through a wiring pattern electrode and via electrodes in other layers.

Note that the switch element SW2 is connected to the switch element SW1 within the switch circuit SWIC and, hence, no via electrodes exist for this connection in the first layer PL1 and the second layer PL2.

On the second layer PL2, first terminals of the switch elements SW6 to SW10 are connected to the common terminal S2 using the same electrode pattern. Note that this electrode pattern is connected to one terminal of the antenna side matching circuit 11B. The other terminal of the antenna side matching circuit 11B is connected to the port electrode PMan2 which is one of the port electrodes arranged in an array on the 16th layer PL16 through a wiring pattern electrode and via electrodes in other layers.

Note that the switch element SW7 is connected to the switch element SW6 within the switch circuit SWIC and, hence, no via electrodes exist for this connection in the first layer PL1 and the second layer PL2.

On a third layer PL3, wiring patterns are provided. On a fourth layer PL4, a ground electrode GND is provided. On or in a fifth layer PL5 to a fifteenth layer PL15, pattern electrodes, via electrodes, wiring electrodes, ground electrodes, and the like defining the transmission filter 12A and the transmission filter 12B are provided.

On the lowermost 16th layer PL16, i.e., on the bottom surface of the multilayer body, port electrodes for external connection are arranged in an array. Referring to FIG. 5, along a side (upper side in the figure) of the 16th layer PL16, the port electrodes PMrH1, PMrH2, PMc1, PMc2, PMrL1, PMrL2, PMc3, and PMc4 are arranged in an array. These port electrodes are respectively connected to the switch elements SW1, SW2, SW4, SW5, SW6, SW7, SW9, and SW10 through via electrodes in other layers.

On the 16th layer PL16, the port electrode PMtH is formed and is connected to the switch element SW3 through pattern electrodes defining the transmission filter 12A in other layers. Further, on the 16th layer PL16, the port electrode PMtL is provided and is connected to the switch element SW8 through pattern electrodes defining the transmission filter 12B in other layers.

As described above, in the high-frequency module 10 according to the present preferred embodiment, the switch elements SW1 to SW10 of the switch circuit SWIC are classified into two groups each including five of the switches, and one group is used for the high band and the other group is used for the low band. The switch elements SW3 to SW5 and the switch elements SW8 to SW10 of the switch circuit SWIC are provided independently so as not to be connected to one another, and these switches can be connected to one another outside the switch circuit SWIC (for example, through the common terminals S1 and S2). Hence, the purposes for which the switch elements SW3 to SW5 and the switch elements SW8 to SW10 are used can be freely changed.

For example, in the present preferred embodiment, since there are five transmission/reception terminals for each of the high band and low band, the switch elements SW1 to SW5 are connected to the common terminal S1 outside of the switch circuit SWIC and the switch elements SW6 to SW10 are connected to the common terminal S2 outside of the switch circuit SWIC. On the other hand, in the case in which there are six (or four) high-band transmission/reception terminals and four (or six) low-band transmission/reception terminals, the same switch circuit SWIC can be used to form another high-frequency module by changing the design of the signal paths in the multilayer body.

Figure 6:
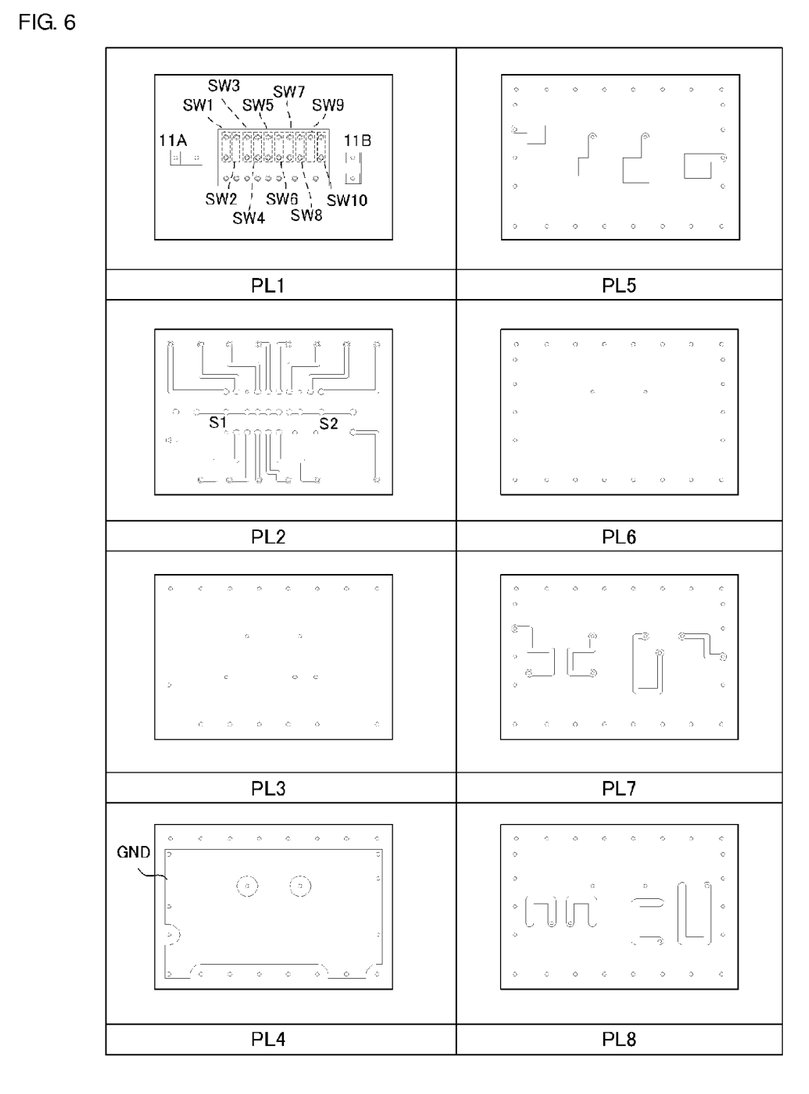
FIG. 6 is a stacking diagram of the high-frequency module in the case in which the number of high-band transmission/reception terminals is six and the number of low-band transmission/reception terminals is four.
Figure 7:
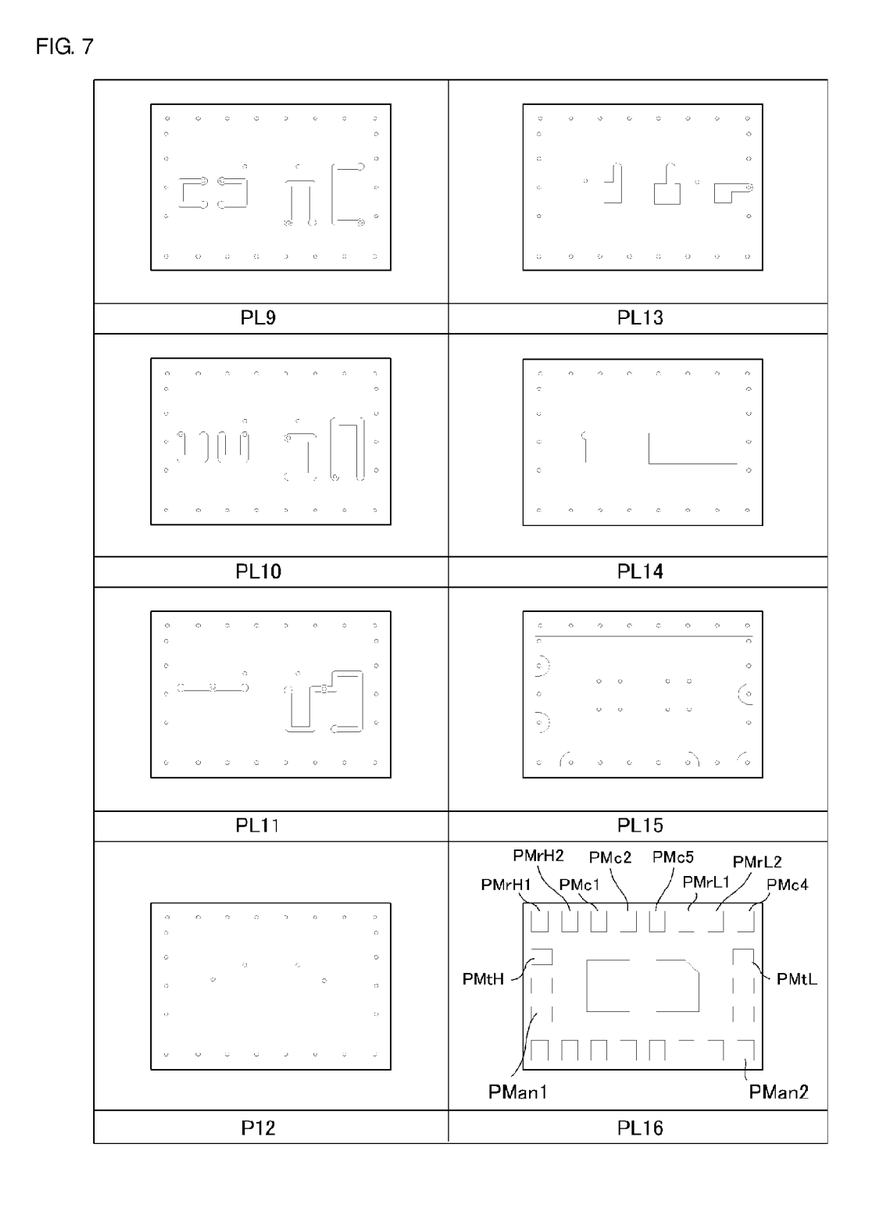
FIG. 7 is a stacking diagram of the high-frequency module in the case in which the number of high-band transmission/reception terminals is six and the number of low-band transmission/reception terminals is four.

FIG. 6 and FIG. 7 are stacking diagrams of a high-frequency module in the case in which the number of high-band transmission/reception terminals is six and the number of low-band transmission/reception terminals is four. In this case, the switch elements SW1 to SW6 are used as high-band switches and the switch elements SW7 to SW10 are used as low-band switches.

In FIG. 6 and FIG. 7, the low band refers to GSM 850, GSM 900, and W-CDMA (Band 5), and the high band refers to GSM 1800, GSM 1900, W-CDMA (Band 1), and W-CDMA (Band 2), and W-CDMA (Band 4).

On the second layer PL2, first terminals of the switch elements SW1 to SW6 are connected the common terminal S1 using the same electrode pattern. This electrode pattern is connected to one terminal of the antenna side matching circuit 11A. The other terminal of the antenna side matching circuit 11A is connected to the port electrode PMan1 which is one of the port electrodes arranged in an array on the 16th layer PL16 through a wiring pattern electrode and via electrodes in other layers.

On the second layer PL2, first terminal of the switch elements SW7 to SW10 are connected to the common terminal S2 using the same electrode pattern. Note that this electrode pattern is connected to one terminal of the antenna side matching circuit 11B. The other terminal of the antenna side matching circuit 11B is connected to the port electrode PMan2 which is one of the port electrodes arranged in an array on the 16th layer PL16 through a wiring pattern electrode and via electrodes in other layers.

On the lowermost 16th layer PL16, port electrodes for external connection are arranged in an array. Referring to FIG. 7, along a side (upper side in the figure) of the 16th layer PL16, the port electrodes PMrH1, PMrH2, PMc1, PMc2, PMc5, PMrL1, PMrL2, PMc3, and PMc4 are arranged in an array. The port electrode PMc5 is a port that outputs a TD-SCDMA transmission signal to the outside and receives a TD-SCDMA reception signal from the outside. These port electrodes are respectively connected to the switch elements SW1, SW2, SW4, SW5, SW6, SW7, SW9, and SW10 through via electrodes in other layers.

Note that similarly to FIG. 3, the switch element SW3 is connected to the port electrode PMtH and the switch element 8 is connected to the port electrode PMtL.

By arranging the pattern electrodes in this manner, the switch elements SW1 to SW6 can be used as high-band switches and the switch elements SW7 to SW10 can be used as low-band switches.

Figure 8:
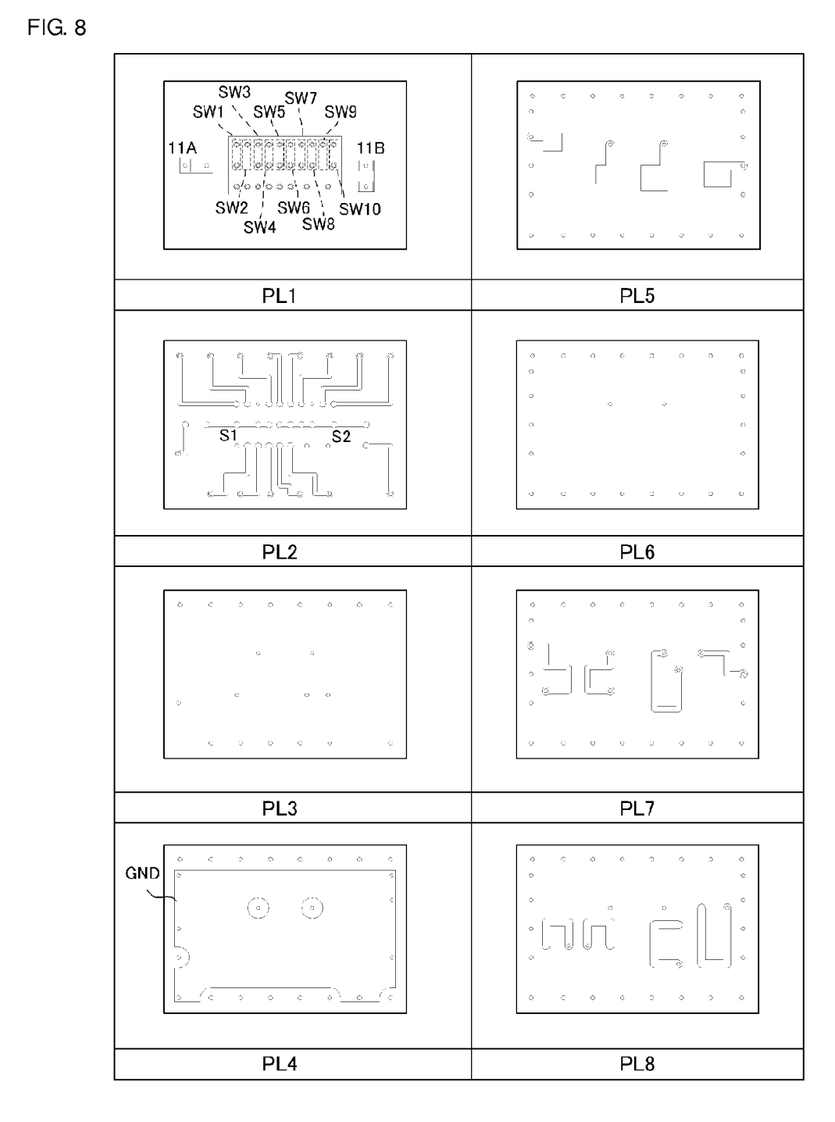
FIG. 8 is a stacking diagram of the high-frequency module in the case in which the number of high-band transmission/reception terminals is four and the number of low-band transmission/reception terminals is six.
Figure 9:
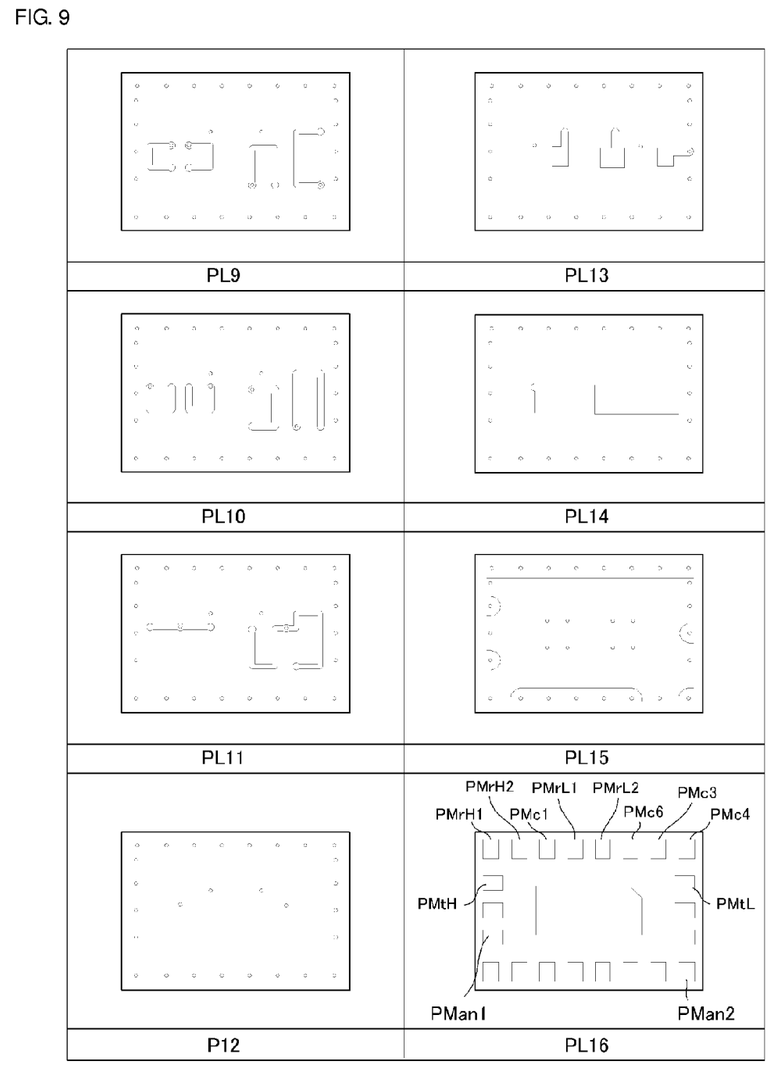
FIG. 9 is a stacking diagram of the high-frequency module in the case in which the number of high-band transmission/reception terminals is four and the number of low-band transmission/reception terminals is six.

FIG. 8 and FIG. 9 are stacking diagrams of a high-frequency module in the case in which the number of high-band transmission/reception terminals is four and the number of low-band transmission/reception terminals is six, for example. In this case, the switch elements SW1 to SW4 are used as high-band switches and the switch elements SW5 to SW10 are used as low-band switches.

In FIG. 8 and FIG. 9, the low band refers to GSM 850, GSM 900, W-CDMA (Band 5), W-CDMA (Band 8), and W-CDMA (Band 13) having a frequency band of 1.7 GHz, and the high band refers to GSM 1800, GSM 1900, and W-CDMA (Band 1).

In the case of FIG. 8 and FIG. 9, on the second layer PL2, first terminals of the switch elements SW1 to SW4 are connected the common terminal S1 using the same electrode pattern. This electrode pattern is connected to one terminal of the antenna side matching circuit 11A. The other terminal of the antenna side matching circuit 11B is connected to the port electrode PMan1 which is one of the port electrodes arranged in an array on the 16th layer PL16 through a wiring pattern electrode and via electrodes in other layers.

On the second layer PL2, first terminals of the switch elements SW5 to SW10 are connected to the common terminal S2 using the same electrode pattern. Note that this electrode pattern is connected to one terminal of the antenna side matching circuit 11B. The other terminal of the antenna side matching circuit 11B is connected to the port electrode PMan2 which is one of the port electrodes arranged in an array on the 16th layer PL16 through a wiring pattern electrode and via electrodes in other layers.

On the lowermost 16th layer PL16, port electrodes for external connection are arranged in an array. Referring to FIG. 9, along a side (upper side in the figure) of the 16th layer PL16, the port electrodes PMrH1, PMrH2, PMc1, PMrL1, PMrL2, PMc6, PMc3, and PMc4 are formed in an array. The port electrode PMc6 is a port that outputs a W-CDMA (Band 9) transmission signal to the outside and receiving a W-CDMA (Band 9) reception signal from the outside. These port electrodes are respectively connected to the switch elements SW1, SW2, SW4, SW5, SW6, SW7, SW9, and SW10 through via electrodes in other layers.

Note that similarly to FIG. 3, the switch element SW3 is connected to the port electrode PMtH and the switch element 8 is connected to the port electrode PMtL.

By arranging the pattern electrodes in this manner, the switch elements SW1 to SW4 can be used as high-band switches and the switch elements SW5 to SW10 can be used as low-band switches.

Note that although the high-frequency module 10 according to the preferred embodiments described above preferably have a configuration in which the switch elements SW1 to SW10 of the switch circuit SWIC are connected to respective port electrodes, a configuration may be used in which the switch elements SW3 to SW5 or the switch elements SW8 to SW10 are not connected to port electrodes. For example, when four high-band transmission/reception terminals and four low-band transmission/reception terminals are required, a configuration may be provided in which two of the switch elements of the switch circuit SWIC are not used.

Further, a configuration may be provided in which the terminals of unused switch elements are connected to a ground electrode (for example, the ground electrode GND of the fourth layer PL4), or unused switch elements are used to switch other circuits, such as power amplifiers.

Note that the design of the specific configuration of the high-frequency module 10 can be appropriately modified, and the operations and advantages described in the preferred embodiments above are only the preferred operations and advantages generated by the present invention. The operations and advantages of the present invention are not limited to those described in the preferred embodiments above.

For example, in the preferred embodiments described above, although the switch circuit SWIC preferably includes 10 switches and the switch elements SW3 to SW5 and the switch elements SW8 to SW10 are independent of one another and not connected to one another within the switch circuit SWIC, the high-frequency module 10 is not limited to this. A configuration may be provided in which none of the switch elements are connected to one another in the switch circuit SWIC. Further the number of switch elements may be appropriately modified.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency module comprising:
   a multilayer body including dielectric layers stacked on each other;
   an external input/output terminal that is provided on the multilayer body and that receives and outputs a signal;
   at least two external connection terminals that are provided on the multilayer body and that output a signal received at the external input/output terminal or receive a signal to be output from the external input/output terminal; and
   a switch circuit mounted on a surface of the multilayer body such that the at least two external connection terminals are outside of the switch circuit, the switch circuit including:
      a first switch element connected to the external input/output terminal and to one of the at least two external connection terminals; and
      a second switch element connected to the first switch element on the external input/output terminal side and to the other of the at least two external connection terminals; wherein
   the switch circuit further includes at least one third switch element that is not connected to the first switch element and the second switch element within the switch circuit and that is arranged to be electrically connected to the first switch element and the second switch element outside the switch circuit.

2. The high-frequency switch module according to claim 1, wherein
   the external input/output terminal is an antenna terminal connected to an antenna;
   the at least two external connection terminals are terminals connected to a communication system that performs communication through the antenna.

3. The high-frequency switch module according to claim 2, wherein
   the external input/output terminal includes:
      a first antenna terminal connected to an antenna supporting a first frequency band; and
      a second antenna terminal connected to an antenna supporting a second frequency band;
   the external connection terminals include:
      a first output terminal that outputs a signal to a communication system supporting the first frequency band;

a first input terminal that receives a signal from the communication system supporting the first frequency band;

a second output terminal that outputs a signal to a communication system supporting the second frequency band; and a second input terminal that receives a signal from the communication system supporting the second frequency band;

the first switch element is one of two first switch elements included in the switch circuit and the second switch element is one of two second switch elements included in the switch circuit;

one of the first switch elements is connected to the first antenna terminal and the first output terminal;

the other of the first switch elements is connected to the second antenna terminal and the second output terminal;

one of the second switch elements is connected to one of the first switch elements on the first antenna terminal side and is connected to the first input terminal; and the other of the second switch elements is connected to the other of the first switch elements on the second antenna terminal side and is connected to the second input terminal.

4. The high-frequency switch module according to claim 1, further comprising:

a ground conductor located in the multilayer body; wherein the third switch element is connected to the ground conductor.

5. The high-frequency switch module according to claim 1, wherein the third switch element is connected to the first switch element and the second switch element through a wiring electrode located on a surface of and/or within the multilayer body.

6. The high-frequency switch module according to claim 1, wherein the switch circuit includes a plurality of switch elements including the first, second and third switch elements, and the plurality of switch elements includes a first group of low frequency band switch elements and a second group of high frequency band switch elements.

7. The high-frequency switch module according to claim 6, wherein each of the plurality of switch elements is one of a field effect transformer switch, a micro electro mechanical system switch, and a diode switch.

8. The high-frequency switch module according to claim 1, wherein the first switch element includes a terminal connected to a common terminal outside of the switch circuit and another terminal is connected to a first antenna terminal through an antenna side matching circuit that defines an electro-static discharge circuit.

9. The high-frequency switch module according to claim 8, wherein the second switch element includes one terminal that is connected within the switch circuit to the one terminal of the first switch element connected to the common terminal, and another terminal that is connected to a first output terminal.

10. The high-frequency switch module according to claim 9, wherein the third switch element includes one terminal that is connected to the common terminal, and another terminal that is connected to a first input terminal through a transmission filter.

11. The high-frequency switch module according to claim 6, wherein within the switch circuit, at least some of the plurality of switch elements of the switch circuit are arranged independent of one another in a non-connected state and are arranged to be connected to one another outside the switch circuit, and are connected to one another through a first or second common terminal.

12. The high-frequency switch module according to claim 6, wherein a total number of the plurality of switch elements is ten and a number of switch elements included in each of the first and second groups of switch elements is five.

13. The high-frequency switch module according to claim 6, wherein a total number of the plurality of switch elements is ten and a number of switch elements included in one of the first and second groups of switch elements is six and a number of switch elements included in the other of the first and second groups of switch elements is four.

* * * * *